United States Patent

[11] 3,557,822

[72] Inventor Clyde H. Chronister
 4 Kings Row, Rte. 14, Houston, Tex. 77040
[21] Appl. No. 823,103
[22] Filed May 8, 1969
[45] Patented Jan. 26, 1971

[54] GATE VALVE
 15 Claims, 5 Drawing Figs.
[52] U.S. Cl. .................................................. 137/315,
 251/87, 251/159, 251/203, 251/328, 251/329
[51] Int. Cl. .................................................... F16k 43/00,
 F16k 5/14
[50] Field of Search .......................................... 137/315;
 251/77, 84, 87, 128, 149.1, 149.9, 158, 159,
 167—170, 193, 197, 198, 203, 326, 327, 328, 329

[56] References Cited
 UNITED STATES PATENTS
 1,120,905 12/1914 Chrisman ...................... 137/315X
 1,530,006 3/1925 Melton ........................ 137/315X
 3,482,816 12/1969 Arnold ........................ 251/329
 FOREIGN PATENTS
 19,709 4/1929 Netherlands ................. 251/328
 191,197 1/1923 Great Britain ................ 251/328

Primary Examiner—M. Cary Nelson
Assistant Examiner—David R. Matthews
Attorneys—James F. Weiler, Jefferson D. Giller, William A. Stout, Paul L. De Verter, II, Dudley R. Dobie, Jr. and Henry W. Hope ABSTRACT: A gate valve having an inlet and outlet conduit extending into a housing and spaced from each other to provide an opening therebetween with a sleeve telescoping with the inlet and outlet conduits and a valve gate positioned for transverse movement into and out of the opening with a sleeve actuating arm pivotally connected to the gate and to the sleeve whereby movement of the gate into the opening moves the sleeve away from the opening and movement of the gate out of the opening moves the sleeve over the opening thereby providing a through conduit-type gate valve in which the gate seals may be changed while the line is in operation. Means for moving the valve gate past the plane of travel of the arm pivot connection to the sleeve for retracting the sleeve towards and against the gate for increasing the sealing pressure and providing a two-way sealing valve. Coacting wedge surfaces on the housing and on both sides of the gate for wedging the gate against the end of the inlet conduit when the gate is moved into the opening for increasing the sealing pressure on the gate. Stem actuating means connected to the gate by a limited and loosely engaging pivoting connection so that the gate may be moved transversely into the opening and also longitudinally.

Clyde H. Chronister
INVENTOR

BY
ATTORNEYS

Clyde H. Chronister
INVENTOR.

BY
ATTORNEYS

GATE VALVE

BACKGROUND OF THE INVENTION

Generally, it is old to provide gate valves which open and close a fluid or gas line and provide double-blocking or sealing in both directions. However, generally such gate valves require that the line be shut down to work upon the gate valve such as changing the seals.

The present invention relates to various improvements in a through conduit gate valve, which may be double sealing if desired, and which provides a structure not only providing increased sealing forces, but which allows the line to remain in operation while work is conducted upon the gate.

Generally, it is also old to provide gate valves having seat rings and seats placed on inside of the valve body and as separate units from the gate. The present invention has the sealing segments installed on both sides of the gate.

SUMMARY

The present invention is directed to a gate valve having a housing and an inlet conduit and outlet conduit extending into the housing and being longitudinally spaced from each other to provide an opening therebetween with a sleeve slidably telescoping with the ends of the conduit to provide a through conduit valve with a valve gate positioned for movement transversely into the opening and a sleeve arm pivotally connected to the gate and the sleeve whereby movement of the gate into the opening moves the sleeve away from the opening and movement of the gate out of the opening moves the sleeve over and closing the opening whereby the gate can be inspected and worked on while the valve is in use.

Another feature of the present invention is including means for moving the arm pivot connection on the gate past the plane of travel of the arm pivot connection on the sleeve thereby retracting the sleeve towards and against the gate when the gate is in the opening to provide increased sealing pressure or, if desired, sealing in both directions.

Another feature of the present invention is the provision of coacting wedging surfaces on the housing and preferably on the two ends of the gate so that the gate when it is in the opening is wedged against the end of the inlet conduit for providing increased sealing in the closed position.

Another feature of the present invention is the provision of tracks engaging one or both ends of the actuating arm pivot connections for guiding and actuation of the sleeve and valve gate.

Still another feature of the present invention is the provision of a connection between the gate moving stem to the gate of a limited but loosely engaging pivot connection to allow the gate to be moved longitudinally into a tighter seal as well as being moved transversely to the line.

Another feature of the present invention is provided wherein the valve housing and conduits are cylindrical thereby allowing the valve to be used in high-pressure installations without reinforcement ribbing required in other gate valves.

DESCRIPTION OF THE PREFERRED EMBODIMENT

Figure 1:
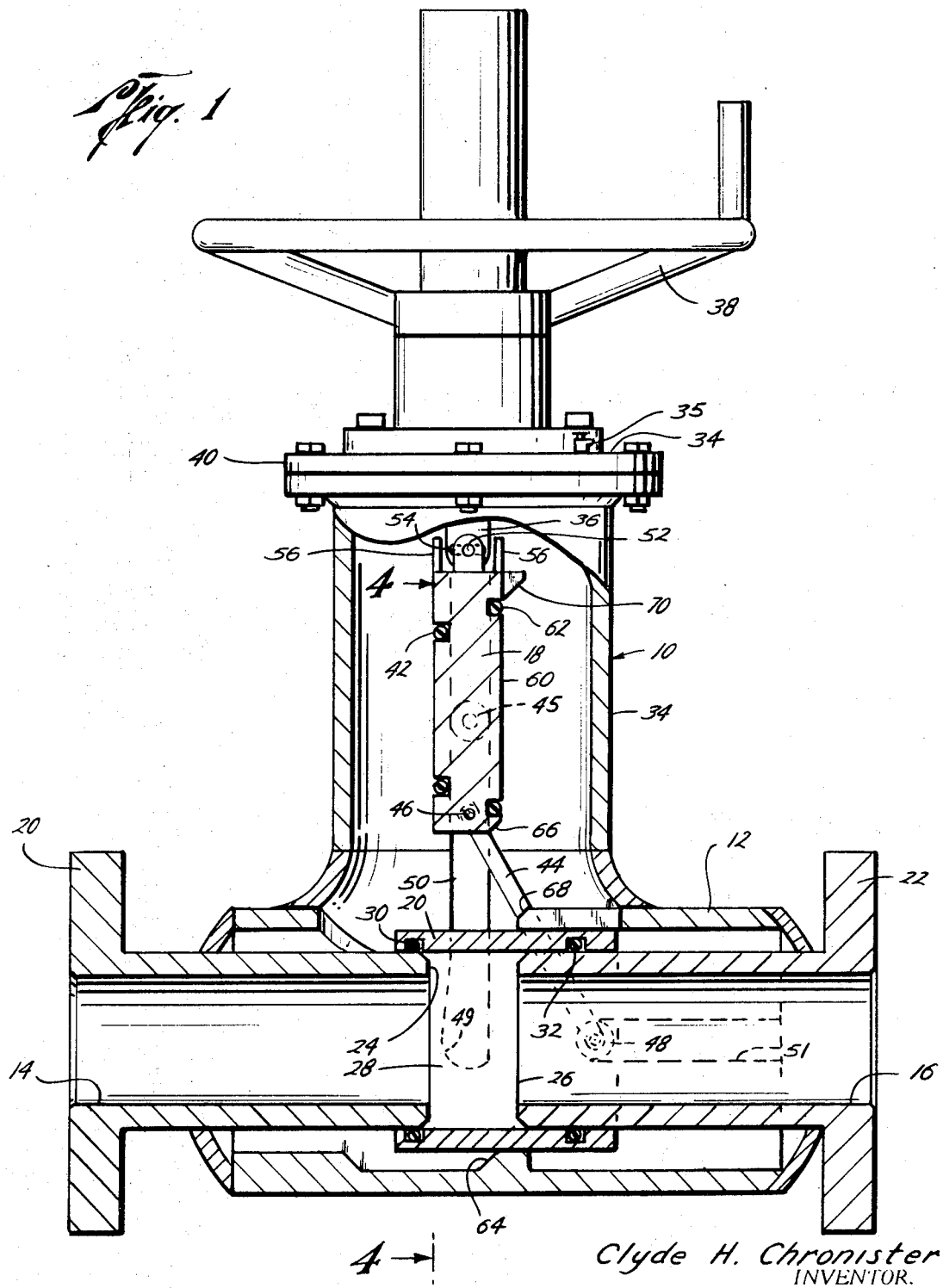
FIG. 1 is an elevational view, partly in cross section, of the apparatus of the present invention, here shown with the valve in the open position.

Referring now to the drawings, and particularly to FIG. 1, the reference numeral 10 generally designates the through conduit gate valve of the present invention, and generally includes a housing 12, an inlet conduit 14, an outlet conduit 16, a valve gate 18, and a sliding sleeve 20.

While the housing 12, inlet 14 and outlet 16 may be of any desired shape, it is preferable that they can be, for purposes of economy and providing necessary strength without requiring ribbing, conventionally sized pieces of cylindrical pipe suitably connected with conventional flange ends 20 and 22 for connection in a pipeline. It is to be noted that the inlet conduit 14 and the outlet conduit 16 are axially aligned but that their respective ends 24 and 26 are longitudinally spaced from each other to provide an opening 28 between the ends 24 and 26.

The sleeve 20 is positioned within the housing 12 and is slidably telescoping with the inlet conduit 14 and outlet conduit 16, preferably on the outside, whereby when the sleeve 20 is positioned covering the opening, as in FIG. 1, a through conduit open valve is provided, that is, a valve which provides an inner diameter as great as that of the conduits 14 and 16. Suitable seal means are provided between the sleeve 20 and the conduits 14 and 16, here shown as O rings 30 and 32 carried by the sleeve 20. It is noted that the ends 24 and 26 of conduits 14 and 16 are beveled in order to avoid damage to seal rings 30 and 32.

The valve gate 18 in the open position (FIG. 1) is positioned in the bonnet 34 of the housing 12 and is positioned for transverse movement to the axis of the conduits 14 and 16 so as to move into and out of the opening 28. The valve gate 18 may be movable in the transverse direction by any suitable means such as a valve stem 36 which is conventionally actuated by a hand wheel 38 acting through conventional gearing or threads (not shown). The bonnet 34 includes suitable access means such as a flange 40 for access to the valve gate 18 as will be more fully described hereinafter.

Seal means are provided between the valve gate 18 and the inlet conduit 14, such as seal 42 on the gate 18 for engagement with the end 24 of the inlet conduit 14 when the gate is positioned in the opening 28.

Figure 2:
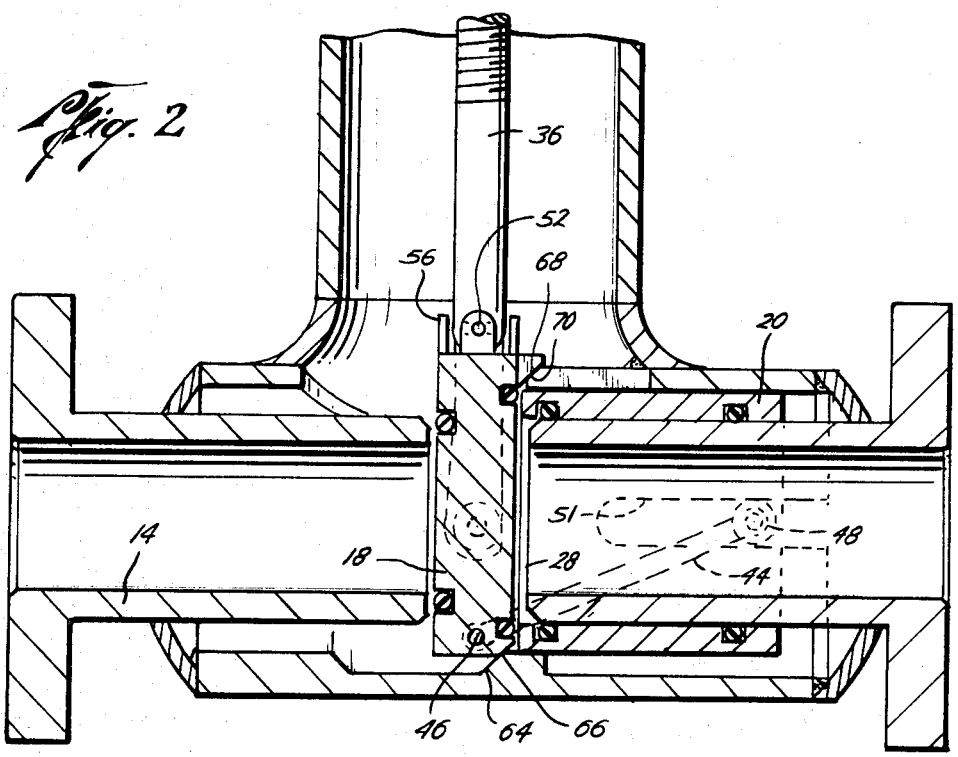
FIG. 2 is a fragmentary elevational view, in cross section, illustrating the valve of FIG. 1 in a partially closed position.

A sleeve-actuating arm, and preferably two arms, 44 are pivotally connected to the gate 18 and to the sleeve 20 at pivots 46 and 48, respectively. Thus, as the gate 18 is moved transversely to the line and as the pivots 48 are to one side of the path of travel of the gate 18, the sleeve 20 will move longitudinally in a telescoping relationship with the conduits 14 and 16. Thus as shown in FIG. 1 when the gate 18 is in a retracted position and out of the opening 28, the sleeve 20 telescopes into a position over and closing the opening 28. However, as best seen in FIG. 2, as the gate 18 is moved transversely to the line and into the opening 28 by the stem 36, the movement of the gate 18 actuates the arms 44 which in turn slide the sleeve 20 out of the way of the opening 28 to allow the gate valve 18 to move into the opening and close the valve 10.

Figure 4:
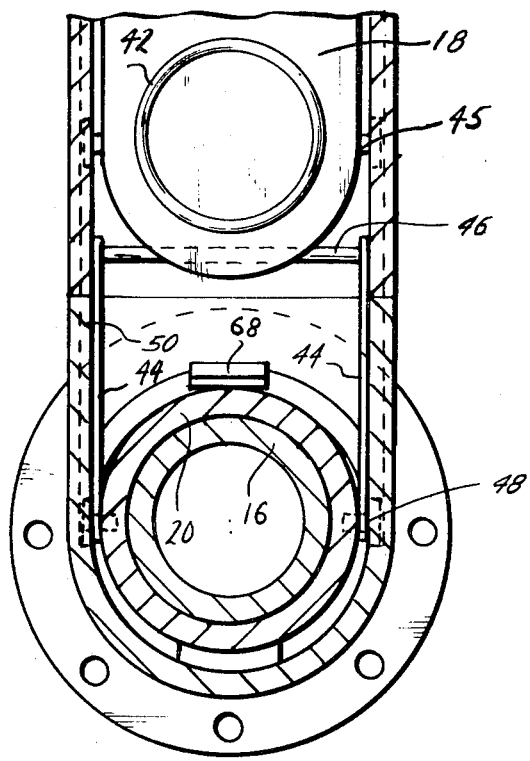
FIG. 4 is a cross-sectional view taken along the line 4—4 of FIG. 1.
Figure 5:
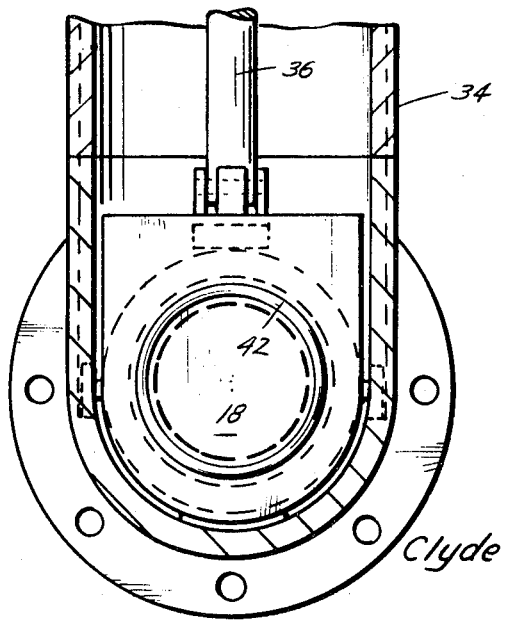
FIG. 5 is a cross-sectional view taken along the line 5—5 of FIG. 3.

Preferably, and as best seen in FIGS. 1 and 4, pins 45 connected to the gate 18 move in a transverse track 50 thereby generally guiding the gate 18 in a transverse direction. Preferably, the track 50 includes a slightly wider portion 49 than the pins 45 to allow longitudinal movement of the gate valve 18 so that when the valve 18 is in the opening 28 it may be moved in a longitudinal direction to increase the sealing action of the seals 42 against the end 24 of the inlet conduit 14. Similarly, it is preferable that the stem 36 be connected to the valve gate 18 by a pivot pin 52 which loosely engages a slot 54 which also allows some longitudinal movement of the gate 18. However, the pivoting movement between the stem 36 and the gate 18 is limited by stop shoulders 56 which keep the gate generally vertically aligned for vertical movement into the opening 28.

For larger sizes and higher service pressures, if desired, the pivots 48 may be disposed in a longitudinal track 51 with bearings (not shown) installed between the housing and the sleeve 20, although the telescoping action of the sleeve 20 on the conduits 14 and 16 may serve to provide this function satisfactorily in smaller sizes and lower service pressures.

Figure 3:
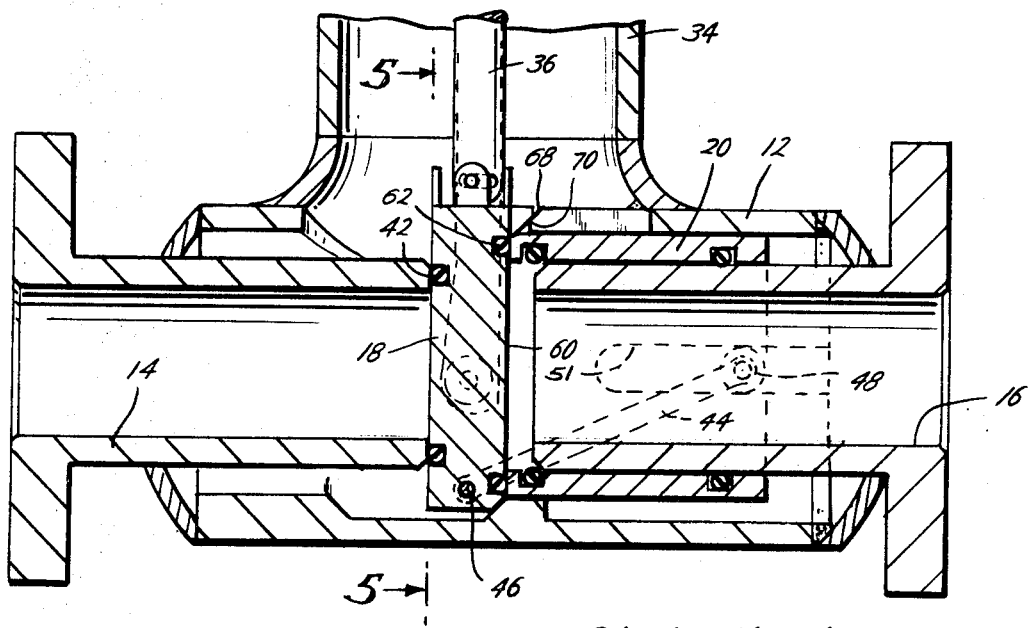
FIG. 3 is a view similar to that of FIG. 2 showing the valve in a completely closed position.

If desired, means may be provided to increase the pressure on the seal 42 to increase the sealing pressure of the valve. Referring now to FIGS. 2 and 3, it is to be noted that when the pivots 46 move pass the line of travel of the pivots 48 at the second end of the arms 44 or the track 51 that further downward movement of the valve gate 18 and the pivots 46 begins to retract the sleeve 20 toward and against the back face 60 of the valve gate 18 thereby pressing the gate and the seal 42 against the end 24 of the inlet conduit 14 to increase the sealing pressure. If desired, the valve 10 can be a double-blocking or double-sealing type valve by providing a seal between the valve 18 and the end 26 of the outlet line 16, here shown as seal 62 on the back face 60 of valve gate 18.

An additional sealing pressure can be obtained upon the upstream seal 42 by providing coacting wedging faces between the housing and the valve gate 18. Thus as shown in FIGS. 1, 2 and 3 a wedging face 64 may be provided in the housing which coacts with a wedging face 66 on one end of the valve 18 and a wedging face 68 may also be provided in the housing 12 to coact with a wedging face 70 at the other end of the valve 18. Thus as shown in FIGS. 2 and 3 downward action of the valve gate 18 will cause coaction of the engaging wedge faces 64 and 66 and 70 with 68 to more securely move the valve gate 18 and thus seal 42 against the end of the inlet conduit 14.

It is to be noted from FIG. 1 that when the through conduit gate valve 10 is in the open position with the sleeve 20 covering the opening 28 that the valve gate 18 will be moved out of the line and positioned in the bonnet 34. The inlet conduit 14 and outlet conduit 16 are sealed by O rings 30 and 32 with gate 18 moved in the most upwardly position. Then the pressure trapped in bonnet 34 which is the area outside conduit but inside the valve housing 12 can be relieved through the vent 35 located on the valve bonnet 34. In this position the access flange 40 may be opened allowing inspection and working on the internal components of the valve 10 and also replacement of the seals 42 and 62 as desired, all without requiring that the pipeline be shut down for this inspection or repair work.

In operation, and referring to FIG. 1 in the open position, the sleeve 20 will cover the opening and will not interfere with or reduce the internal working diameter of the conduits 14 and 16. When it is desired to actuate and close the valve 10, the wheel 38 may be conventionally actuated to move the valve stem 36 and thus move the valve gate 18 transversely to the line. Downward movement of the valve gate 18 moves the actuating arms 44 and slides the sleeve 20 away from the opening 28. And as best seen in FIG. 2, as the valve gate 18 moves in position into the opening 28 and the pivots 46 on the gate end of arms 44 have gone past the path of travel of the pivots 48 on the sleeve end of the arm 44 or past dead center, the sleeve 20 is retracted towards and move against the valve gate 18 to bring the seal 42 into a tighter sealing relationship with the end of the inlet conduit 14. Similarly, engagement of the coacting wedge surfaces 66 and 70 on the gate 18 coact with the mating surfaces 64 and 68 in the housing to increase the sealing pressure of the gate 18 against the inlet conduit 14. In addition, the sleeve 20 will be moved into tight engagement with the back face 60 of the gate 18 and against the seal 62 to provide a double-blocking or double-sealing action of the valve.

The present invention, therefore, is well adapted to carry out the objects and attain the ends and advantages mentioned as well as others inherent therein.

I claim:

1. A valve comprising:
   a housing;
   an inlet conduit and an outlet conduit extending into the housing and being axially aligned with each other and each having one end positioned in the housing and longitudinally spaced from each other to provide an opening between said ends;
   a sleeve within said housing slidably telescoping with said ends of the inlet and outlet conduits in a sealing relationship whereby when the sleeve covers the openings, flow is permitted through the conduits but is prevented from entering the housing;
   a valve gate positioned for movement transversely to the axis of said conduits and into and out of said openings;
   seal means on one of the valve gate and the end of the inlet conduit for closing the end of the inlet conduit when the gate is moved into the opening;
   a sleeve-actuating arm pivotally connected to the gate and to the sleeve, the connection to the sleeve being off the transverse line of movement of the gate whereby movement of the gate into the opening moves the sleeve away from the opening and movement of the gate out of the opening moves the sleeve over the opening; and
   means for moving said gate in said transverse direction.

2. The apparatus of claim 1 wherein the means for moving said gate includes means for moving the arm pivot connection on the gate past the plane of travel of the arm pivot connection on the sleeve for moving the sleeve towards and against the gate.

3. The apparatus of claim 2 including seal means on one side of the said gate and said sleeve for sealing said valve in both directions when the sleeve is moved against the gate.

4. The apparatus of claim 3 wherein both the seal means for sealing between the gate and the inlet conduit and the seal means for sealing between the gate and the sleeve are positioned on the gate.

5. The apparatus of claim 1 including, coacting wedging surfaces, one of which is on the housing and the other being on the gate adjacent the arm pivot connection for wedging said gate against the end of the inlet conduit when the gate is moved into the opening.

6. The apparatus of claim 5 wherein the means for moving said gate includes means for moving the arm pivot connection on the gate past the plane of travel of the arm pivot connection on the sleeve for moving the sleeve towards and against the gate.

7. The apparatus of claim 6 including, a transverse track engaging and guiding said gate as the gate moves into and out of said opening.

8. The apparatus of claim 7 wherein the means for moving the gate is connected to the gate by a limited and loosely engaging pivoting connection.

9. The apparatus of claim 1 including, coacting wedging surfaces at the edges of the gate and on the housing on opposite sides of the opening for wedging the gate against the end of the inlet conduit when the gate is moved into the opening.

10. The apparatus of claim 1 including, a transverse track engaging and guiding said gate as the gate moves into and out of said opening.

11. The apparatus of claim 10 including, a longitudinal track engaging and guiding the arm pivot connection on the sleeve.

12. The apparatus of claim 1 wherein the means for moving said gate is connected to the gate by a limited and loosely engaging pivot connection.

13. The apparatus of claim 1 including, access means in said housing adjacent the gate when the gate is positioned out of said opening.

14. The apparatus of claim 1 wherein said seal means is on the valve gate.

15. The apparatus of claim 1 wherein the valve housing, inlet conduit, and outlet conduit are tubular.